April 6, 1937.  R. O. BERG ET AL  2,076,062
BURR REMOVING APPARATUS
Filed May 14, 1936  3 Sheets-Sheet 2
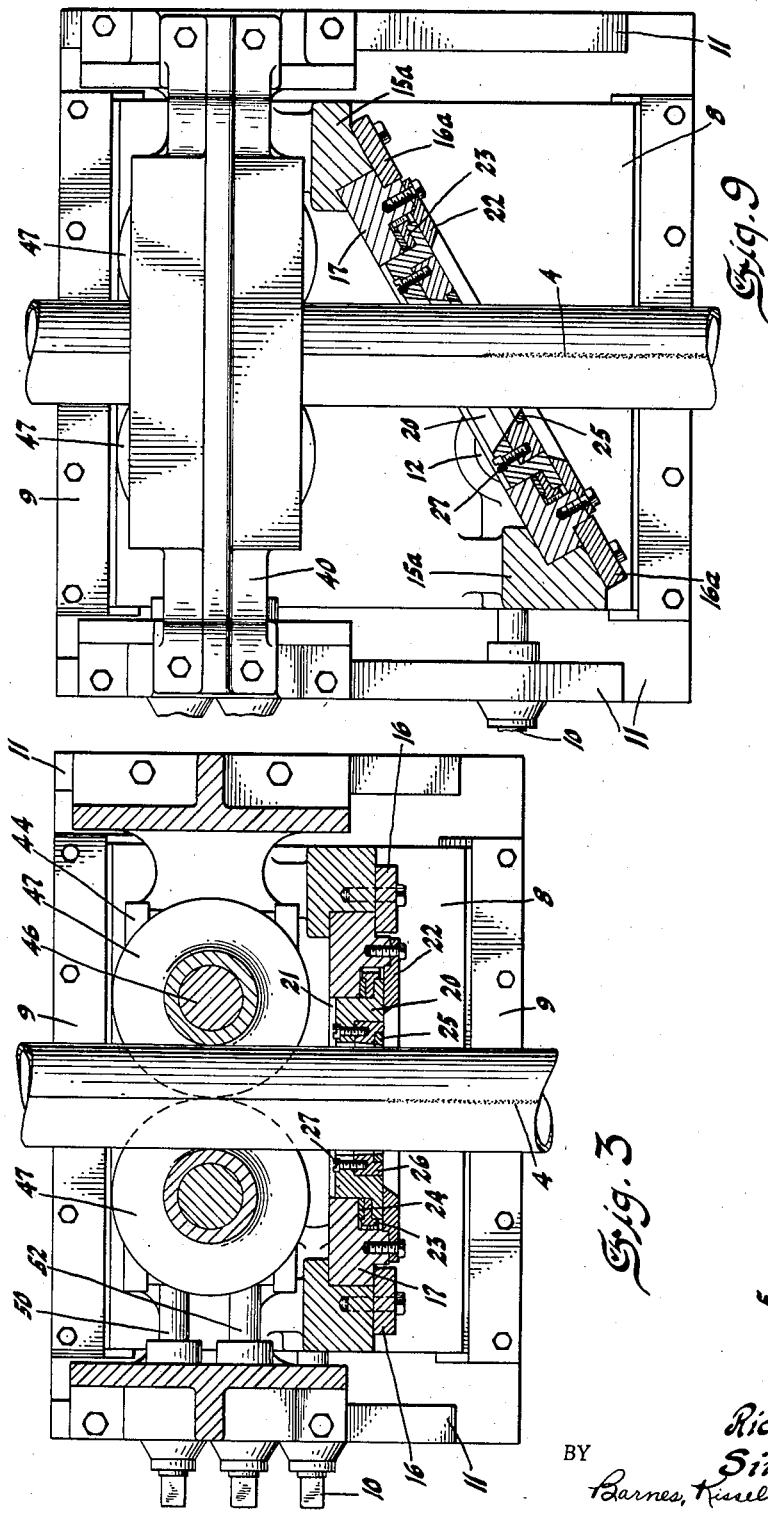
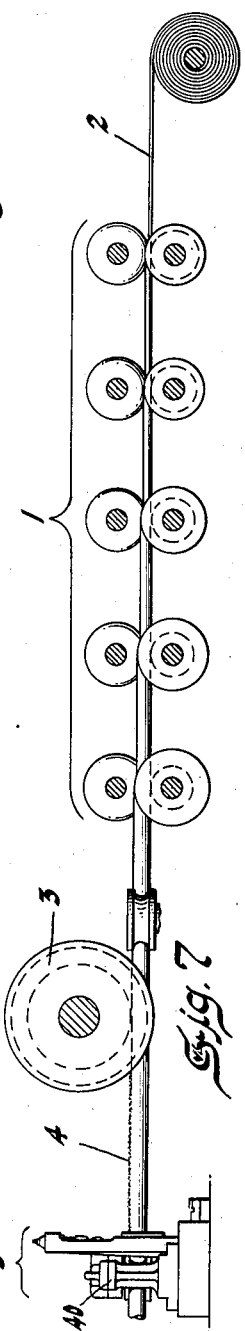
INVENTORS
Richard O. Berg &
Simon Berg
BY Barnes, Kisselle, Laughlin & Raisch
ATTORNEY.

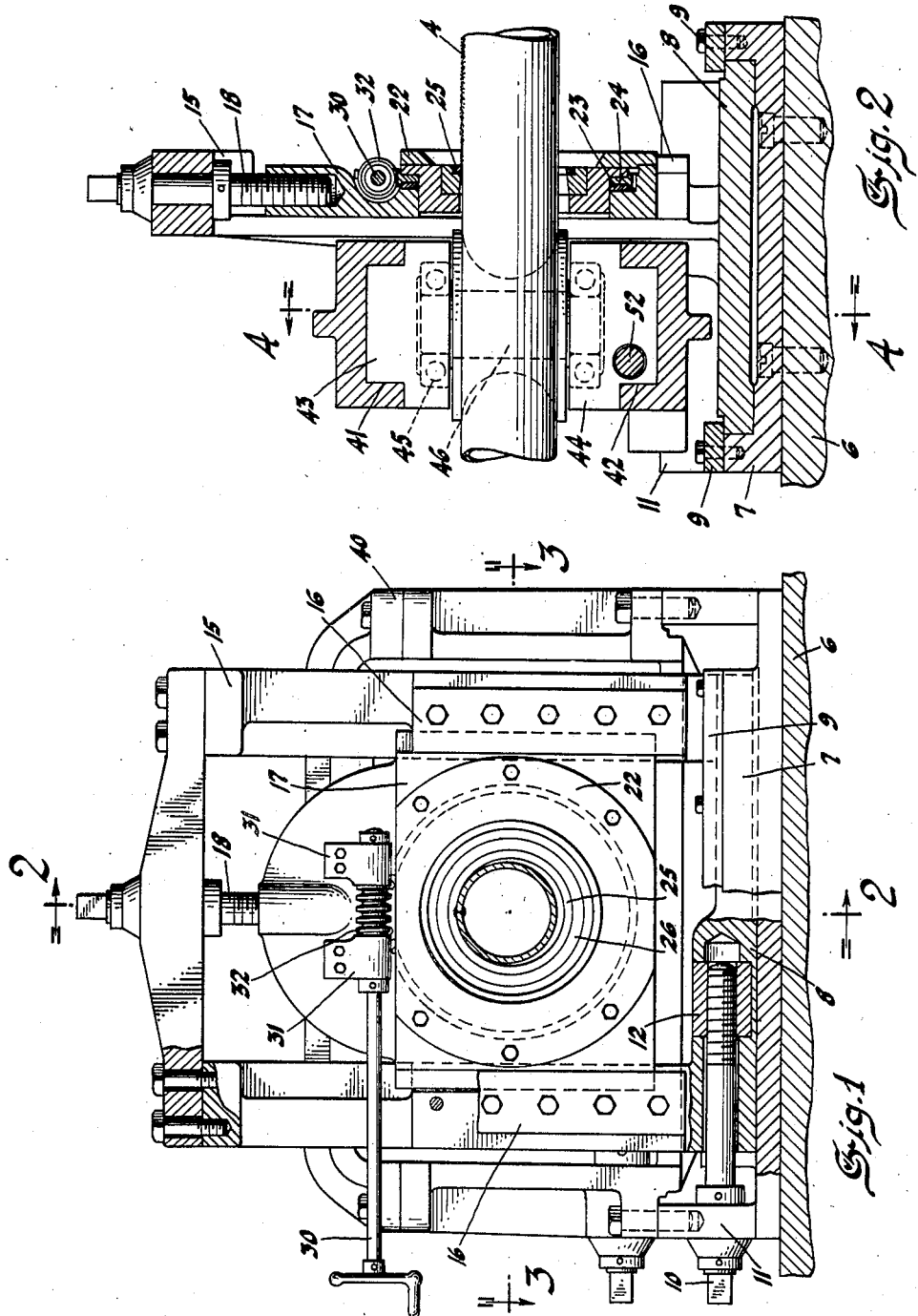

April 6, 1937.  R. O. BERG ET AL  2,076,062
BURR REMOVING APPARATUS
Filed May 14, 1936  3 Sheets-Sheet 3
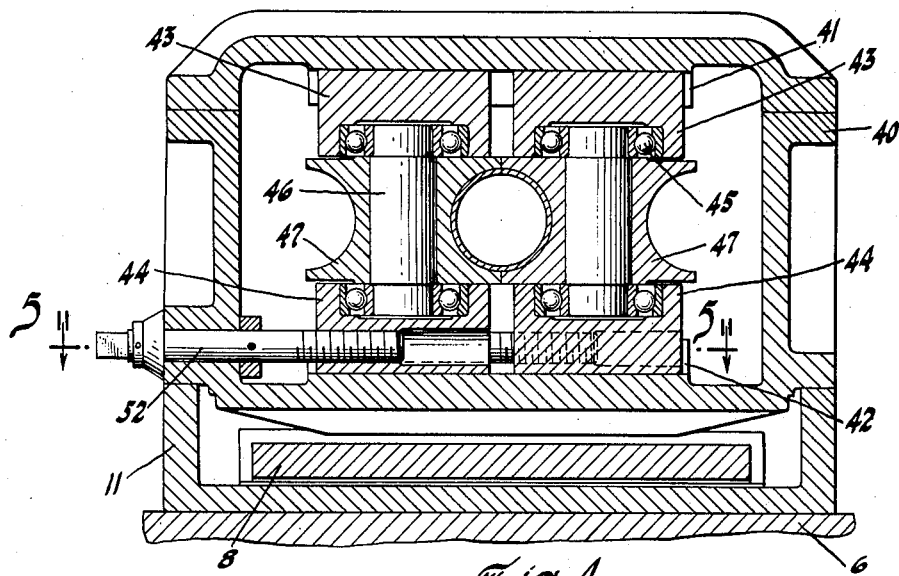
Fig. 4
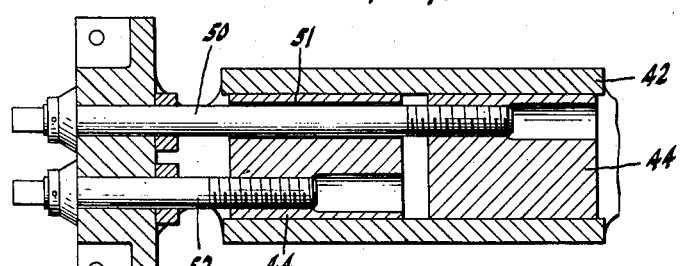
Fig. 5
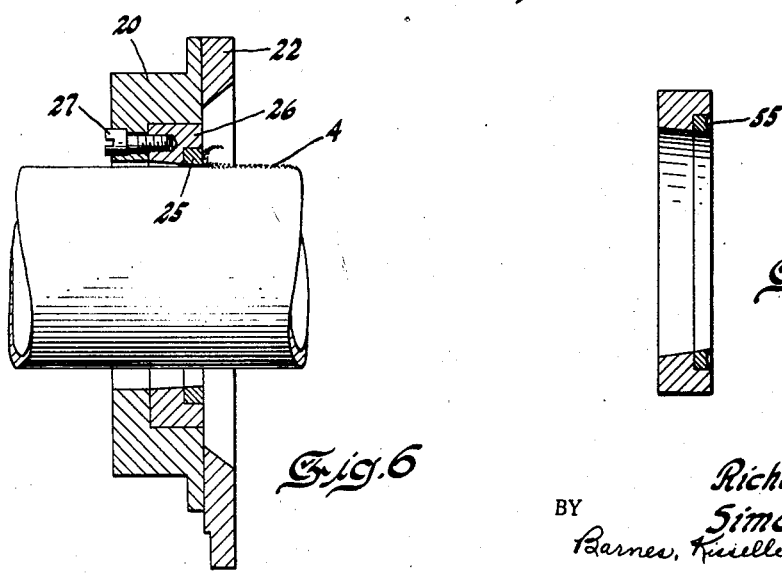
Fig. 6
Fig. 8
INVENTORS
Richard O. Berg &
Simon Berg
BY Barnes, Kisselle, Laughlin & Raisch
ATTORNEY.

Patented Apr. 6, 1937

2,076,062

UNITED STATES PATENT OFFICE 2,076,062

BURR REMOVING APPARATUS

Richard O. Berg and Simon Berg, Detroit, Mich., assignors to Michigan Steel Tube Products Company, Detroit, Mich., a corporation of Michigan Application May 14, 1936, Serial No. 79,700

9 Claims. (Cl. 29—33)

This invention relates to the art of making welded tube, and particularly tubing which has a burr or projecting metal at the seam and which is formed by the weld. Such a tube, for example, is tube made from strip sheet stock fashioned into tubular form with its edges brought into abutting relationship and welded.

Obviously the invention is not limited to this precise form of tube, although this type of tube is shown in the present application to illustrate the invention. Such welded tube may be used for various purposes where the presence of a burr on the exterior of the tube is undesirable, as for example, tube used in metal furniture, or for rails or other places where it is preferred that the exterior of the tube appeal to the aesthetic sense, or for that matter, structural or mechanical elements.

The object of the present invention is the provision of a device for removing the burr from such a tube. To this end the invention contemplates an apparatus through which such tubing may be passed, in which action the burr is cut off. It is, of course, desirable to preserve as near as possible the exterior contour of the tube, that is to say to retain the circular form, where the tube is intended to be circular in cross section; and to this end the apparatus includes a cutting instrument designed to cut the burr off on a radius approximating that of the tube. Further, the invention contemplates a cutting instrument having a cutting edge of relatively great length and which is adjustable from time to time so that new sections of the cutting instrument may be brought into cutting position as the sections become dull. To provide such a cutting instrument and to also provide for the cutting of the burr on the radius, the cutting instrument takes the form of a circular member surrounding the tube, so mounted that it may be adjusted as desired on its own axis.

In the accompanying drawings:

Fig. 1 is a view of a device constructed in accordance with the invention, illustrating the same partly in elevation and partly in section.

Fig. 2 is a vertical section taken substantially on line 2—2 of Fig. 1.

Fig. 3 is a horizontal section taken substantially on line 3—3 of Fig. 1.

Fig. 4 is a vertical section taken substantially on line 4—4 of Fig. 2 and illustrating tube guide rolls.

Fig. 5 is a detail sectional view taken substantially on line 5—5 of Fig. 4 showing adjusting means for the guide rolls.

Fig. 6 is a detail sectional view taken through the cutting element.

Fig. 7 is a diagrammatical illustration of a tube forming machine, with the burr trimming apparatus associated therewith.

Fig. 8 is a view of a modified form of the cutting element.

Fig. 9 is a view of one arrangement of the cutting element with the same disposed at an angle.

First referring to Fig. 7: In this view a tube forming machine is diagrammatically shown as comprising a series of forming rollers 1 through which strip stock 2 is moved and progressively fashioned into tube until its edges abut, and electrode means of an electric welding machine is shown at 3, the edges being welded at this point. The edges are uppermost as shown in Fig. 7, and after the weld is formed a burr 4 is found upon the tube, due to the pressure and the throwing up of the heated metal. The tube is completed structurally after it passes the electrodes; however, to remove the burr the apparatus of this invention may be so associated with the welding machine that the tube runs through the same after being welded. The apparatus is generally illustrated at 5 in Fig. 7.

Referring now to Fig. 2: The device may rest upon a suitable support 6 and includes a base plate 7 for supporting and guiding an adjustable plate 8, guide members being shown at 9. The plate 8 is adjustable transverse to the axis of the tube and an adjusting member 10 may be journalled in an upstanding portion 11 of the base plate 7. This member has a screw threaded connection with the plate 8. For this purpose the plate 8 may have a bored out portion machined to receive a threaded plug 12. It will be noted that turning of the member 10 will shift the plate 8 to the right or left as Fig. 2 is viewed.

A frame structure 15 is mounted on the plate 8 and it is equipped with vertical guide means 16. A vertically adjustable member 17 is mounted in the guide means and is vertically adjustable by means of a screw threaded member 18 journaled in the top of the frame 15 and having a screw threaded connection with the member 17, as shown in Fig. 2.

This member 17 carries the cutting instrument, and the cutting instrument is journaled therein. To this end a carrier member 20 is journaled in an aperture 21 in the member 17 and may be held in position by a face plate 22. The aperture 21 is enlarged in its forward portion and a worm gear member 23 with external teeth is mounted on the member 20. A suitable thrust washer 24 may be disposed between this ring gear and the wall portion of the member 17. The member 20 in turn carries a cutting instrument 25 which is preferably mounted as by means of a press fit in a carrying ring 26 secured to the member 20 by screws 27 as shown.

An adjusting member may take the form of a shaft 30 having a suitable operating handle, as shown, journaled in brackets 31 which are mounted upon the member 17 and having a worm 32 meshing with the teeth of the worm gear 23.

Before proceeding with the description of the operation of this portion of the apparatus it is to be pointed out that the cutter 25 is of circular ring form and that the tube passes therethrough. The internal diameter of the cutter, however, is slightly larger than the tube so as to provide suitable clearance. It will be noted by reference to Fig. 1 that the cutter is disposed eccentrically of the tube so that the knife engages and trims off the burr as illustrated in Fig. 6, with the knife clearing the tube at other places around the tube circumference.

As the tube is made on the welding machine the seam is definitely positioned which is uppermost as shown in Fig. 7, and the tube, being in the welding machine is held with the burr thus positioned. The cutter is adjustable transversely of the axis of the tube by means of the slidable plate 8, and it is vertically adjustable by means of the vertically adjustable member 17. Thus the cutter can be accurately positioned. It will be appreciated that only a small portion of the cutting edge functions at any given time. As it becomes dull an operator may turn the shaft 30, thus rotating the cutter on its axis. This adjustment may be made with substantially step by step action, from time to time, so that successive portions of the cutting edge are brought into cutting relation with the burr. Thus a cutting instrument will last for quite a long time, the length of its cutting edge being that of its inner periphery. At the same time the burr is severed on a radius which is that of the cutter. It is preferred that the radius of the cutter be held as close as feasible to that of the tube so that the arc of the cutting approximates that of the exterior surface of the tube. Thus the finished tube has no substantially visible flat spot. After the entire cutting edge has been dulled it may be removed and a new one replaced, this being accomplished by the removable holding screws 27, and the dulled cutter, of course, may then be sharpened.

To further hold the tube in proper alignment guide rolls may be provided. To this end there may be a frame 40 positioned to the rear of the frame 15 provided with an upper guide way 41 and a lower guide way 42, for receiving holding blocks 43 and 44. These holding blocks may be recessed for the reception of antifriction bearings 45 in which may be journaled the stub shafts 46 of guide rollers 47. Each roller is preferably adjustable by means such as shown in Fig. 5. Here there is shown a screw threaded shaft 50 journaled in part of the frame which extends through a bore 51 in the near block 44 and is threaded into the far block 44. Another screw threaded shaft 52 is similarly mounted and screw threaded into the near block 44. By this adjustment means, the two rollers may be adjusted to the right or to the left to properly align them for the reception of a tube. The rollers may be interchanged for rollers of a different size to accommodate different sized tube. This may be done by removing the upper portion of the frame 40. When larger tube is made, large rollers are installed and they may be adjusted away from each other to properly accommodate the tube, and when smaller tube is made, smaller rollers may be installed and they may be adjusted toward each other, these adjustments being made by the screw threaded shafts 50 and 52.

The cutting device shown in Figs. 1 and 2 illustrates the cutting edge disposed at right angles to the tube. However, it is within the invention to angularly dispose the cutter and this is illustrated in Fig. 9. Many of the reference characters heretofore used are applied to Fig. 9, since the parts are essentially the same. However, the frame portions 15a are positioned one forward of the other so that the member 17 may be positioned at an angle in the guides 16a. Although the knife is positioned at an angle to the tube, the plate 8 may have the same adjustment as that shown in Fig. 1, which adjustment is perpendicular to the axis of the tube. In this form, however, the internal peripheral surface of the cutting instrument 25 which is shown as being on an angle, as illustrated in Fig. 3, may be provided on a greater angle as illustrated in Fig. 9 so as to adequately clear the tube wall and particularly that portion of the tube wall on the right side of the tube, as Fig. 9 is viewed.

A modified form of the cutting instrument is illustrated in Fig. 8. This instrument is in the form of a ring, as is the form previously described, but its forward surface is recessed or hollow ground, as shown at 55. This, of course, provides a more prominent cutting edge and is more in the nature of an optional type of cutter.

The burr trimming apparatus may, and preferably is, used in combination with a welding machine so that the tube is welded and the burr removed in one handling or one continuous process. However, it is feasible to use the apparatus for trimming the burr from tube where the apparatus is separate from the welding machine, and separate lengths of tube are passed through the apparatus.

As has been mentioned above, such a tube may be used for furniture, rails, or ornamental purposes or the like, and such tube is very often finished with an exterior plating metal such as chromium or other surfacing metal. The plating, of course, covers over the seam uniformly as it does over the rest of the tube, and inasmuch as the burr is cut on a radius approximating that of the tube, the finished tube has the appearance of being seamless.

We claim:

1. An apparatus for trimming the burr from butt welded tube comprising, an apertured supporting member through which a tube is to be moved lengthwise, a cutting instrument in the form of a ring, means for removably journaling the same in the apertured support, the internal diameter of the cutting instrument being slightly greater than the external diameter of the tube, said support arranged to hold the ring eccentrically of the tube whereby one portion of its circumferential cutting edge is in cutting relationship with the burr, and substantially all the remaining portions are free of the tube and means operable at will for holding the ring against rotation and for rotatably adjusting the ring so the successive sections of the ring may be brought into cutting position as the successive sections become dull from use.

2. An apparatus for trimming the burr from butt welded tube comprising, an apertured supporting member through which a tube is to be moved lengthwise, a cutting instrument in the form of a ring mounted in the supporting member and through which the tube moves, said ring having an internal diameter greater than the external diameter of the tube, and means for adjusting the position of the ring transversely of the tube in a direction toward and away from the burr and in a direction transversely of the tube and substantially perpendicular to the first mentioned direction.

3. An apparatus for trimming the burr from butt welded tube comprising, a supporting member, a carrier member supported thereby, said carrier member arranged to have the tube passed therethrough, a cutting instrument in the form of a ring journaled in the carrier member and through which the tube is to be passed, the internal diameter of the ring being somewhat larger than the external diameter of the tube and arranged to be positioned eccentrically of the tube so that one portion of its circumferential cutting edge trims the burr from the tube, means for adjustably shifting the support transversely of the tube, and means for adjustably shifting the carrier transversely of the tube and in a direction substantially perpendicular to the direction of the adjustment of the support.

4. An apparatus for trimming the burr from butt welded tube comprising, a supporting member, a carrier member supported thereby, said carrier member arranged to have the tube passed therethrough, a cutting instrument in the form of a ring journaled in the carrier member and through which the tube is to be passed, the internal diameter of the ring being somewhat larger than the external diameter of the tube and arranged to be positioned eccentrically of the tube so that one portion of its circumferential cutting edge trims the burr from the tube, means for adjustably shifting the support transversely of the tube, means for adjustably shifting the carrier transversely of the tube and in a direction substantially perpendicular to the direction of the adjustment of the support, and means for rotatably adjusting the cutting instrument whereby to bring successive portions of its circumferential cutting edge into cutting engagement with the burr.

5. An apparatus for trimming the burr from butt welded tube comprising, a cutting instrument, means for holding the instrument in cutting relationship with the burr of a lengthwise moving tube, and guide means for the tube adjacent the cutting instrument including supporting means, two pairs of blocks slidably mounted upon the supporting means, a pair of opposed rollers, one journaled between each pair of blocks, means for adjusting one pair of blocks with its roller transversely of the tube, and independent means for adjusting the other pair of blocks and its roller transversely of the tube.

6. An apparatus for trimming the burr from butt welded tube comprising, a cutting instrument in the form of a ring with a circumferential cutting edge and having an internal diameter somewhat greater than the external diameter of the tube, and through which a tube is to be moved lengthwise, means for journaling the ring and for holding it at an angle to the axis of the tube and at an angle to a plane perpendicular to the plane of the axis of the tube, with a portion of the cutting edge in cutting relationship with the burr, and means for holding the ring against rotation and rotatably adjusting the ring at will on its axis to bring successive portions of its cutting edge into cutting relationship with the burr.

7. An apparatus for trimming a burr or the like from a length of stock which has at least a part of its exterior surface of curved formation and wherein the burr is on said curved surface, comprising, a cutting instrument in the form of a ring having a circumferential cutting edge and through which the length of stock is to be moved lengthwise, the internal diameter of the ring being greater than the greatest cross dimension of the said length of stock, means for holding the ring so that one portion of its cutting edge is in cutting relationship with the burr and with the other portions of the cutting edge substantially clear of said length of material, and means operable at will for rotatably adjusting the ring but normally preventing rotation thereof whereby to bring successive portions of its cutting edge into cutting relationship with said burr at will.

8. In combination with a tube forming machine for fashioning strip stock into tubular form with opposed edges substantially abutting and for welding said edges together; of means for trimming the burr at the weld comprising, a cutting instrument in the form of a ring through which the welded tube passes, the internal diameter of the ring being greater than the external diameter of the tube, means for holding the ring eccentrically of the tube so that one portion of its circumferential cutting edge is in cutting relationship with the burr, with the remaining portions of the cutting edge substantially free of the tube; said welding machine holding the tube against rotation on its axis so that the burr remains in a position to be trimmed by the cutting instrument, and means operable at will for rotatably adjusting the ring but normally holding the ring against rotation whereby to bring successive portions of its circumferential cutting edge into cutting relationship with the burr at will.

9. An apparatus for trimming the burr from butt welded longitudinally moving tube comprising, a cutting instrument in the form of a ring through which the tube passes, the internal diameter of the ring being greater than the outside diameter of the tube, means for holding the ring eccentrically relative to the tube with one section of its circumferentially cutting edge in cutting relation with the burr, said ring being arranged in the holding means so that the same may be turned upon its own axis, and adjusting and holding means operable at will normally holding the ring against rotary movement on its own axis for maintaining a given section of its cutting edge in position to trim the burr from the tube, and operably adjustable to impart rotary movement to the ring on its own axis whereby successive sections of its cutting edge may be brought into trimming relation with the burr as the sections become dull in use.

RICHARD O. BERG.
SIMON BERG.